United States Patent
Schuetz et al.

(10) Patent No.: US 6,650,950 B2
(45) Date of Patent: Nov. 18, 2003

(54) METHOD FOR MONITORING AN OUTPUT UNIT

(75) Inventors: Hartmut Schuetz, Heroldsbach (DE); Andrea Ringler, Pegnitz (DE); Manfred Mueller, Erlangen (DE); Johann Schinnerl, Graz (AT)

(73) Assignee: Siemens Aktiengellschaft, Munich (DE)

( * ) Notice: Subject to any disclaimer, the term of this patent is extended or adjusted under 35 U.S.C. 154(b) by 190 days.

(21) Appl. No.: 09/851,163

(22) Filed: May 9, 2001

(65) Prior Publication Data

US 2002/0007224 A1 Jan. 17, 2002

Related U.S. Application Data

(63) Continuation of application No. PCT/DE99/03396, filed on Oct. 22, 1999.

(30) Foreign Application Priority Data

Nov. 9, 1998 (DE) .......................... 198 51 558

(51) Int. Cl.⁷ ................................. G05B 9/02
(52) U.S. Cl. ..................... 700/79; 700/1; 714/715; 702/108
(58) Field of Search ................ 700/79, 21, 1; 714/715, 720, 738; 702/57, 108

(56) References Cited

U.S. PATENT DOCUMENTS

| | | | | |
|---|---|---|---|---|
| 5,390,191 A | * | 2/1995 | Shiono et al. | 714/727 |
| 5,880,954 A | * | 3/1999 | Thomson et al. | 700/79 |
| 5,926,621 A | * | 7/1999 | Schwarz et al. | 714/26 |
| 6,260,167 B1 | * | 7/2001 | Lo et al. | 714/744 |
| 6,549,034 B1 | * | 4/2003 | Pietrzyk et al. | 326/38 |

FOREIGN PATENT DOCUMENTS

| | | |
|---|---|---|
| EP | 0 155 213 A1 | 9/1985 |
| EP | 0 292 914 A1 | 11/1988 |
| FR | 2 707 406 A1 | 1/1995 |
| WO | WO 96/28769 | 9/1996 |
| WO | WO 98/14848 | 4/1998 |
| WO | WO 00/28390 | 5/2000 |

\* cited by examiner

Primary Examiner—Ramesh Patel
Assistant Examiner—Ronald D Hartman, Jr.
(74) Attorney, Agent, or Firm—Sughrue Mion, PLLC

(57) ABSTRACT

A method for monitoring the output function of an output unit (9). In particular, the output unit is a binary output unit of a safety-oriented programmable logic controller, which controls actuators (11) of an external technical process. The output function of the output unit (9) is monitored within a predetermined time interval by using bit patterns, which are produced by the external technical process, and by using bit patterns, which have not been transmitted by the output unit (9) to the actuators (11) of the external technical process. Therein, the number of output test bit patterns is reduced to a necessary minimum.

5 Claims, 2 Drawing Sheets

METHOD FOR MONITORING AN OUTPUT UNIT

This is a Continuation of International Application PCT/DE99/03396, with an international filing date of Oct. 22, 1999, which was published under PCT Article 21(2) in German, and the complete disclosure of which is incorporated into this application by reference.

FIELD OF AND BACKGROUND OF THE INVENTION

The invention relates to a method for monitoring an output function of an output unit. More specifically, the output unit can be a binary signal output unit of a safety-oriented programmable logic controller, which controls actuators of an external technical process.

Safety-oriented binary signal output units, which have a respective read-back circuit for each output, are known in the art. These read-back circuits verify the correct functioning of the respective output by check-reading. The output bit patterns produced by the external technical process are checked by a target/actual comparison. In addition, if the dynamics of the output signals are low, Supplementary Tests are required, which must be executed within prescribed time intervals in order to assure operational safety. Conventional binary signal output units use the following two test strategies.

First, the highest test quality is obtained by applying a complete set of test bit patterns to the output unit and by check-reading these test bit patterns. In this complete test, it is disadvantageous that, during short test pulses, a voltage is applied to the actuators. This can reduce the life span of the actuators, in particular in view of the frequency of the test pulses.

Second, an intermediate test quality is obtained if, for each enabling signal that is transmitted to the external technical process via the output of the output unit, the capability of the output for transmitting a disabling signal is checked. This creates short interruptions of the controlled actuators, which can also reduce the life span of the actuators.

Both tests have the further disadvantage that they cause frequent switching of currents that are caused by loads in the system. In particular, this disadvantage has become noticeable in recently developed, technically advanced output units. In the past, simple-structured output units predominated, whose Supplementary Test could be implemented by a small number of different test patterns. Nowadays, however, the safety-oriented output units increasingly have ASICs and microprocessors or microcontrollers. For these structures, pattern-sensitive tests are prescribed. This causes a significant increase in the number of test patterns. The frequency of the test patterns has other negative effects on the technical environment, such as EMC interference, increased energy consumption, increased noise development, and mechanical vibrations.

OBJECTS OF THE INVENTION

It is one object of the present invention to reduce the number of the bit patterns that are applied to the output unit and that are check-read when the Supplementary Test is carried out.

SUMMARY OF THE INVENTION

According to one formulation of the present invention, this and other objects are achieved in that an output function of an output unit is checked within a predetermined time interval. To this end, only those bit patterns are used that have not been transmitted by the output unit to actuators of an external technical process within that predetermined time interval. Therein, the output unit controls the actuators of the external technical process.

According to another formulation of the present invention, this and other objects are achieved by commencing a predetermined time interval and by executing an external technical process. Therein, actuators are controlled with operational bit patterns during the time interval and the operational bit patterns are compared with test bit patterns. An output function is checked with only those test bit patterns that do not coincide with the operational bit patterns.

The present invention includes preferred embodiments, which are related to each of the aforementioned test strategies. A first preferred embodiment reduces the number of test bit patterns in the aforementioned complete Supplementary Test. In the case of a predetermined total set of bit patterns, which are to be output and check-read within a time interval that is predefined based on safety requirements, the output bit patterns, which are produced by the external technical process, are balanced in a list. To this end, the output unit is provided with a memory, which stores all the bit patterns that are output in one time interval. In addition, only the bit patterns that have not yet occurred or have not yet been activated in the list are output and check-read in the form of test bit patterns. This balancing and activating of bit patterns must be re-executed in each time interval. At the start of each time interval, a time counter is reset and the list of bit patterns is cleared. The length of the time intervals is a function of the applicable safety requirements and is, for instance, one hour. If all the bit patterns to be checked are produced by the process within one time interval anyway, no further bit pattern needs to be applied and check-read for test purposes within that time interval. If, however, within one time interval, the output unit outputs, as a function of the external technical process, none of the predefined bit patterns to be checked, all the predefined test bit patterns are applied and check-read within that one time interval. In most cases, some of the bit patterns to be checked will be produced by the process so that the number of bit patterns that have to be applied and check-read for test purposes is reduced.

A second preferred embodiment according to the invention improves the aforementioned test of intermediate test quality. The output bit patterns produced by the process and the disabling test bit patterns are marked in a set point list or target list, which is reduced compared to the first test strategy. Other than that, the second preferred embodiment does not differ from the first preferred embodiment.

The method according to the present invention thus avoids a repeated output of test patterns for test purposes. Due to the method according to the present invention, the load on the actuators is reduced by up to 50% compared to conventional Supplementary Tests. This prolongs the life span of the actuators and reduces the previously mentioned disadvantages encountered in the prior art, e.g., EMC interference, increased energy consumption, noise development and mechanical vibrations.

BRIEF DESCRIPTION OF THE DRAWINGS

The invention and further advantageous refinements of the invention according to the features of the dependent claims are explained in more detail below with the aid of diagrammatic, exemplary embodiments in the drawings, in which:

DETAILED DESCRIPTION OF THE PREFERRED EMBODIMENTS

Figure 1:
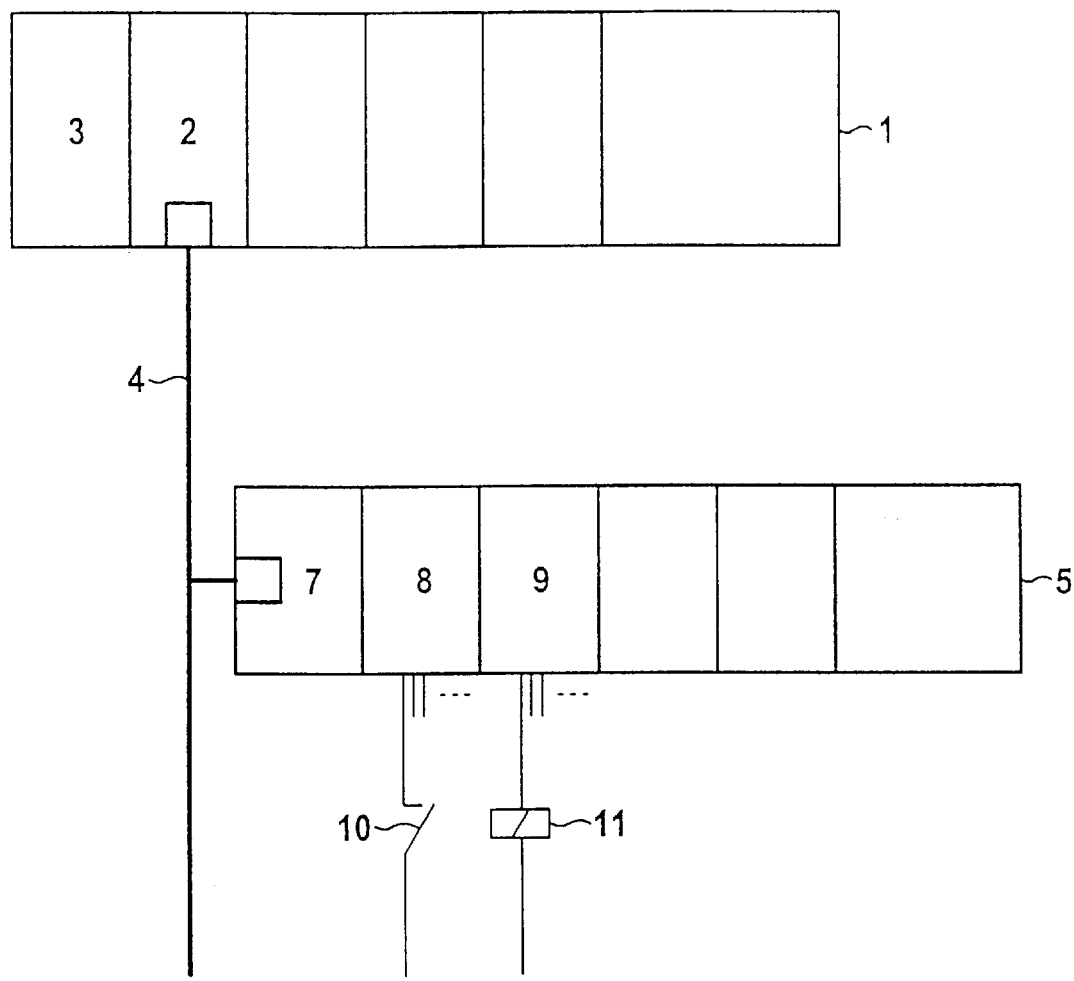
FIG. 1 shows a preferred embodiment of an arrangement of a safety-oriented programmable logic controller.

FIG. 1 shows a preferred embodiment of an arrangement of a safety-oriented programmable logic controller. This arrangement includes a higher-level automation device in a central frame 1. The central frame 1 has a safety-oriented central unit 2 and a power supply 3. A data bus 4 connects the central frame 1 with at least one expansion frame 5. The expansion frame 5 includes a bus coupling module 7, peripheral units (not depicted), a digital input unit 8, and a digital output unit 9 for monitoring or controlling an external technical process. The technical process is connected with the expansion frame 5 via at least one sensor 10 and at least one actuator 11. An expansion frame bus (not depicted) connects the units in expansion frame 5. In addition, a memory (not depicted) balances the bit patterns that occur within a certain time interval.

The safety-oriented programmable logic controller functions as follows. The digital input unit 8 reads signals from the sensor 10 via either one channel or two channels, depending on the required safety class. Thereafter, the digital input unit 8 forwards the signal information to the central unit 2. The central unit 2 links this information in a safety-oriented manner with e.g. previously determined intermediate results and other previously read signals. Thereby, the central unit 2 generates process commands and forwards them to the digital output unit 9 in question. The digital output unit 9 controls the actuators 11, executes a target/actual comparison of the process commands, and organizes its remaining safety measures independently from the central unit 2. The central unit 2, the digital input unit 8, and the digital output unit 9 each perform a self-test in such a way that the required safety class is met.

The output unit 9 controls the actuators 11 of the external technical process. Therein, the output function of the output unit 9 is checked within a predetermined time interval by only such bit patterns that have not been transmitted, within the predetermined time interval, by the output unit 9 to the actuators 11 of the external technical process. Bit patterns that are transmitted by the output unit 9 to the actuators 11 of the external technical process are balanced, and only non-balanced bit patterns are applied to the output unit 9 and check-read as test bit patterns. In a preferred embodiment, the output unit 9 checks the output function independently, i.e. without cooperation, of the central unit 2.

Figure 2:
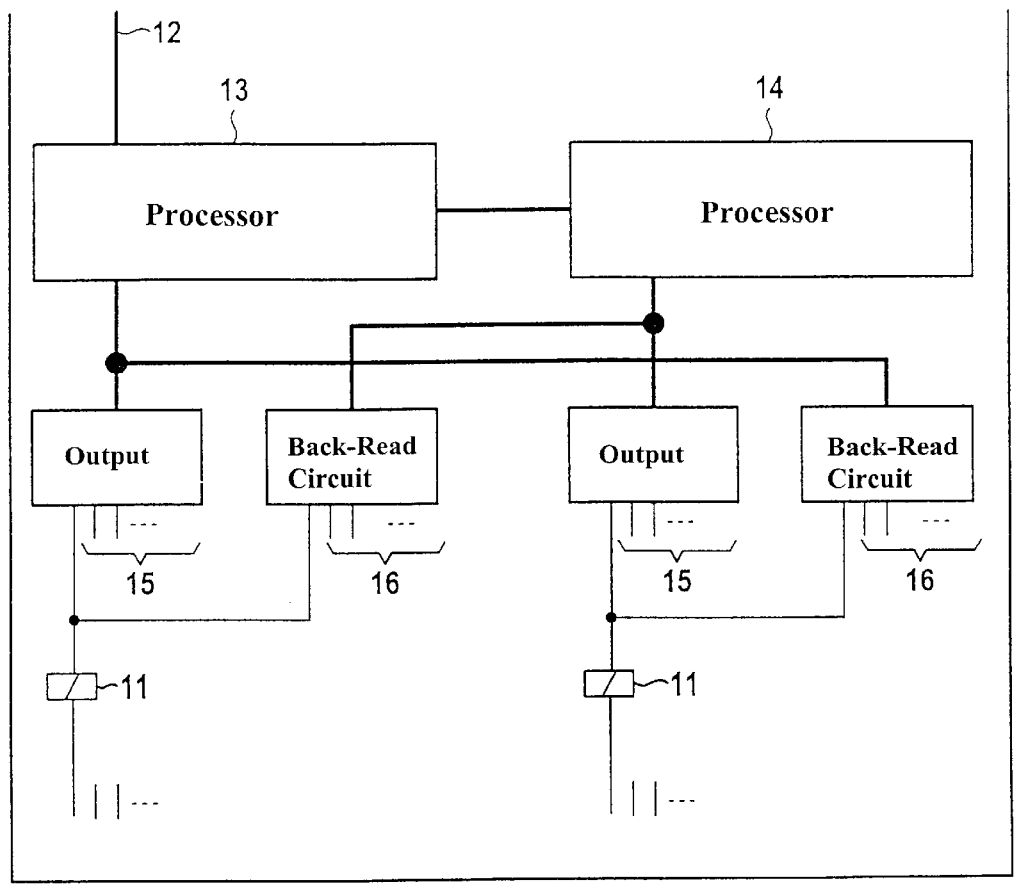
FIG. 2 shows a preferred embodiment of a safety-oriented digital output unit.

FIG. 2 illustrates, by way of example, the structure of the safety-oriented digital output unit 9, the self-test of which relates to the method according to the present invention. The coupling to the expansion frame bus 12 and the test control are effected by means of two coupled processors 13, 14. The output unit 9 has a number of outputs 15, half of which are processed by the first processor 13 and the other half of which are processed by the second processor 14. Back-read circuits 16, which are associated with each of the outputs 15, are processed by the respectively other processor 14, 13. Each output 15 and each associated back-read circuit 16 are jointly connected with an actuator 11.

In summary, it should be noted that the number of output test bit patterns is reduced to the minimum number required.

A method is proposed for monitoring the output function of an output unit. In particular, the output unit is a binary output unit of a safety-oriented programmable logic controller, which controls actuators of an external technical process. The output function of the output unit is monitored within a predetermined time interval by using bit patterns, which are produced by the external technical process, and by using bit patterns, which have not been transmitted by the output unit to the actuators of the external technical process. Therein, the number of output test bit patterns is reduced to a necessary minimum.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for monitoring an output function of an output unit, wherein the output unit controls actuators of an external technical process, wherein the output function of the output unit is checked within a predetermined time interval by means of only such bit patterns that have not been transmitted, within the predetermined time interval, by the output unit to the actuators of the external technical process, and wherein second bit patterns that are transmitted by the output unit to the actuators of the external technical process are balanced.

2. The method as claimed in claim 1, wherein the output unit comprises a binary output unit of a safety-oriented programmable logic controller.

3. The method as claimed in claim 1, wherein only non-balanced bit patterns are applied to the output unit and check-read as test bit patterns.

4. The method as claimed in claim 1, wherein the output function is checked by the output unit independently, without cooperation of a central unit.

5. A method for monitoring an output function of an output unit, comprising:
   commencing a predetermined time interval; and
   executing an external technical process by
      controlling actuators with operational bit patterns during the time interval;
      comparing the operational bit patterns with test bit patterns; and
      testing the output function by checking with only those test bit patterns that do not coincide with the operational bit patterns.

* * * * *